US012618282B2

(12) United States Patent
Baird

(10) Patent No.: US 12,618,282 B2
(45) Date of Patent: May 5, 2026

(54) SECURABLE VEHICULAR LOCK BOX

(71) Applicant: Skyler Baird, Cottonwood Heights, UT (US)

(72) Inventor: Skyler Baird, Cottonwood Heights, UT (US)

( * ) Notice: Subject to any disclaimer, the term of this patent is extended or adjusted under 35 U.S.C. 154(b) by 152 days.

(21) Appl. No.: 17/978,774

(22) Filed: Nov. 1, 2022

(65) Prior Publication Data

US 2023/0140284 A1 May 4, 2023

Related U.S. Application Data

(60) Provisional application No. 63/274,847, filed on Nov. 2, 2021.

(51) Int. Cl.
| | |
|---|---|
| *E05G 1/00* | (2006.01) |
| *B60R 7/08* | (2006.01) |
| *E05B 65/00* | (2006.01) |
| *E05B 65/52* | (2006.01) |
| *E05B 73/00* | (2006.01) |

(52) U.S. Cl.
CPC .............. *E05G 1/005* (2013.01); *B60R 7/087* (2013.01); *E05B 65/0075* (2013.01); *E05B 65/52* (2013.01); *E05B 73/0005* (2013.01)

(58) Field of Classification Search
CPC .............. E05B 19/0005; E05B 45/005; E05B 65/0014; E05B 65/0075; E05B 65/52; E05B 73/00; E05B 73/0005; E05B 73/0023; E05G 1/005; E05G 1/024; E05G 1/04; E05G 1/10; B60R 7/087
See application file for complete search history.

(56) References Cited

U.S. PATENT DOCUMENTS

| | | | | |
|---|---|---|---|---|
| 6,279,798 | B1 * | 8/2001 | Partch .................... | B60N 3/002 |
| | | | | 297/188.2 |
| 6,681,969 | B1 * | 1/2004 | Giedeman, III ........ | B60R 7/043 |
| | | | | 297/188.2 |
| 8,083,113 | B2 * | 12/2011 | Klosk ....................... | B60R 7/02 |
| | | | | 224/547 |
| 8,297,667 | B2 * | 10/2012 | Pauken ............... | E05B 73/0005 |
| | | | | 24/600.9 |
| 9,216,697 | B1 * | 12/2015 | Hayes ..................... | E05G 1/026 |
| 9,530,266 | B2 * | 12/2016 | Delattre ................. | E05G 1/005 |
| 10,232,790 | B1 * | 3/2019 | Adrain ..................... | E05G 1/00 |
| 10,773,654 | B2 * | 9/2020 | Adrain ..................... | B60R 7/14 |
| 11,773,624 | B2 * | 10/2023 | Klein ..................... | E05G 1/005 |
| | | | | 109/52 |
| 2002/0011505 | A1 * | 1/2002 | Cole ......................... | B60R 5/00 |
| | | | | 224/275 |
| 2004/0045329 | A1 * | 3/2004 | Farnham ............. | E05B 73/0005 |
| | | | | 70/161 |
| 2007/0246495 | A1 * | 10/2007 | Hague .................... | B60R 7/087 |
| | | | | 224/281 |
| 2024/0067292 | A1 * | 2/2024 | Weidman ................. | B62J 43/30 |

* cited by examiner

*Primary Examiner* — Christopher J Boswell
(74) *Attorney, Agent, or Firm* — Travis Banta; Ascent IP Law

(57) ABSTRACT

Disclosed herein is a lock box that includes an upper portion, a lower portion, a lock, and a hinge. The lower portion is connected to upper portion. One or more connectors are attached to the lower portion and are detachably connectable to one or more anchors. The lock locks the upper portion and the lower portion together at a first end. The hinge connecting the upper portion and the lower portion together at a second end.

18 Claims, 8 Drawing Sheets

SECURABLE VEHICULAR LOCK BOX

TECHNICAL FIELD

The disclosure relates generally to a lock box that is securable to a vehicle using existing vehicle components and components of the lock box.

BACKGROUND

The earliest known strongbox was found in Egypt in the tomb of Ramesses II and dates back to around 1300 BCE. Another ancient strongbox was preserved in Pompei, Italy due to the eruption of Mount Vesuvius in 79 CE. Accordingly, strong boxes have been used for millennia to secure valuable items. Strongboxes have often been equipped with a lock allowing only the person with the key or combination to access the contents found therein. The durable nature of the strongbox made it difficult to break, but also made it heavy and difficult to transport. As a result, strongboxes were often placed and secured in a particular location.

As modes of transportation have changed, the need for strongboxes to be transported increased. As these modes of transportation developed throughout the ages so too did the tactics of thieves, pirates, and outlaws who pursued the vehicles to try to acquire, illegally or otherwise, any valuables in the strongboxes. During the mid to late 1800s in the United States, stagecoach and train robberies became popular. Famous outlaws such as Jessie James, Butch Cassidy, and the Sundance Kid found strongboxes to provide quick and easy money, albeit ill-gotten quick and easy money. To combat train robberies large heavy strongboxes were installed in trains and were guarded by armed guards. Stagecoaches during this time, to keep valuables safe, employed an armed guard and bolted the strongbox to the stagecoach with varying success. The drawback to heavy strongboxes is it makes the strongboxes difficult to transport from one mode of transportation to another. If the strongboxes were to remain in the train or stagecoach, not only did the strongbox add weight to the vehicle, but it required loading at the beginning of the trip and unloading once the destination was reached, frequently in unpredictably safe locations. The loading and unloading of a vehicle often occurred with other people around making the valuable cargo more vulnerable during these times.

Today in the United States, the most popular form of transportation in is a vehicle i.e., a car, truck, or van. Almost every vehicle manufactured since 2002 and sold in the U.S. is equipped with anchor for a child seat connection system called Lower Anchors and Tethers for Children ("LATCH"). These standards were developed to provide a way to correctly install child seats in a vehicle without using a seatbelt. As a result, seats in vehicles in the US, manufactured in or after 2002 in the US, are equipped with certain anchors that are secured to a frame of the vehicle seat. These anchors within the child seat securing systems provide a connection point for child car seats. Other names of similar child seat anchor systems include: ISOFIX ("International Standards Organisation Fix"), CANfix child seat anchor system from Canada, LUAS ("Lower Universal Anchor System"), and the UCSSS ("Universal Child Seat Safety System").

Though the LATCH system and other systems, provide a secure location to position a child car seat it does not provide any security for other valuables in a vehicle. Items in a vehicle are routinely stolen. Windows in these vehicles that allow a driver and passengers to see what is going on around the vehicle also provide thieves with a view of the contents within the vehicle. A glass window is a poor deterrent for a valuable item, in many cases. Within moments a "smash and grab" thief can strip a car of all valuables. Most vehicles do have a glove compartment, but most glove compartments are made of plastic and are easily compromised, if locked at all. Furthermore, glove compartments may do more to point to the location of the valuable items than to deter thieves from stealing them. Locked consoles function similarly to glove compartments and signal to a thief where valuable items are likely to be found.

SUMMARY

Disclosed herein is a secured vehicular lock box. The vehicular lock box is a lock box that includes an upper portion, a lower portion, a lock, and a hinge. The lower portion is connected to upper portion. One or more connectors are attached to the lower portion and are detachably connectable to one or more anchors. The lock locks the upper portion and the lower portion together at a first end. The hinge connecting the upper portion and the lower portion together at a second

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings.

DETAILED DESCRIPTION

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar methods.

Reference will now be made in detail to the exemplary embodiments, examples of which are illustrated in the accompanying drawings. Wherever possible, the same or similar reference numbers are used throughout the drawings to refer to the same or similar parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
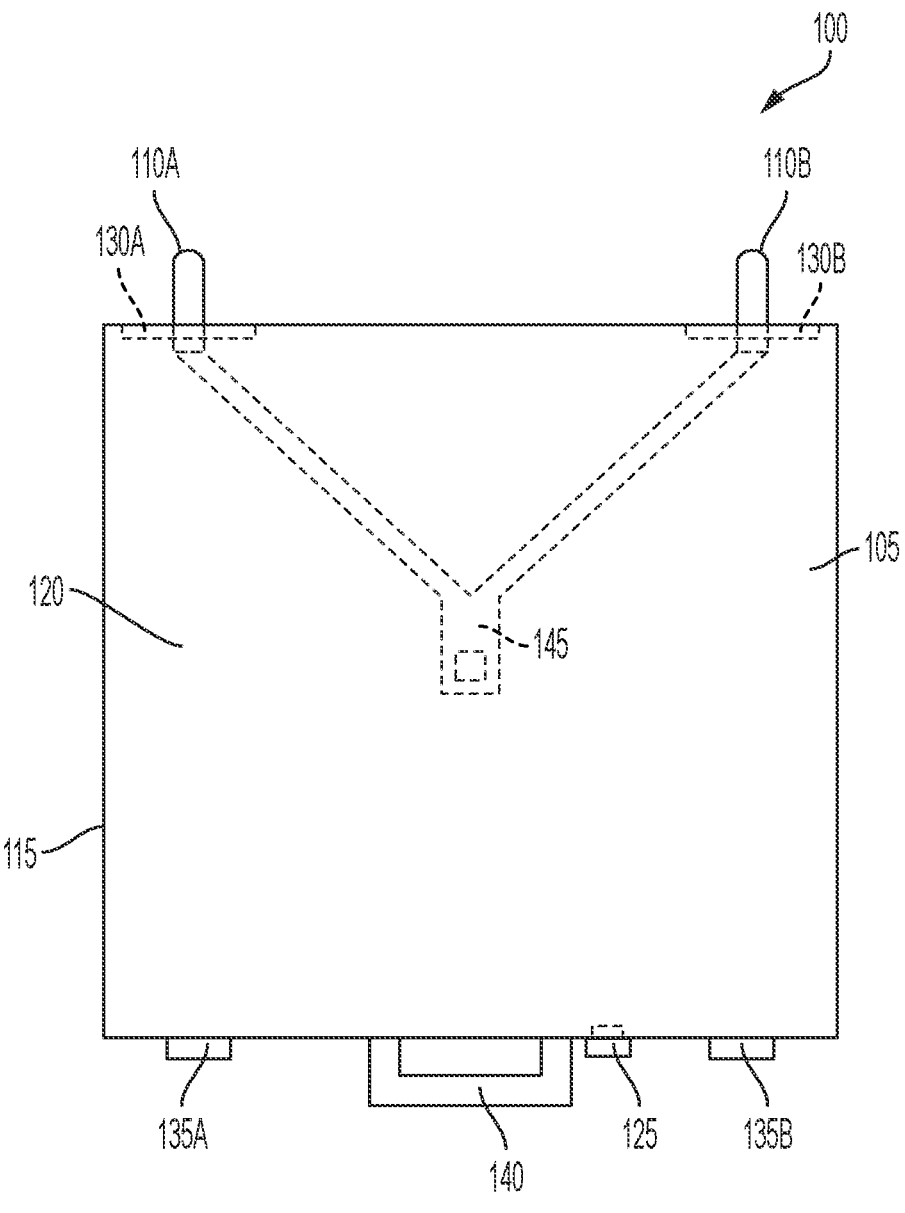
FIG. 1 illustrates a top view of an embodiment of an unattached closed vehicular lock box.

Further, LATCH is a child seat securing system used in the United States. Other child seat securing systems such as ISOFIX, CANfix, LUAS, UCSSS, or other child seat securing systems known in the art may comparably interact with the lock box and its components. The lock box described below may use anchors in any child seat securing system but also may be anchored to other portions of a vehicle. Also, the lock box may be equipped to be anchored to objects found on the outside of a vehicle or objects having little or no association with a vehicle FIG. 1 illustrates a top view of device 100 as an unattached closed vehicular lock box 105. Lock box 105 may be constructed of durable material that makes lock box 105 difficult to break or penetrate. Lock box 105 may include material that provides resistance to fires in that lock box 105 may include non-conductive insulation that keeps the contents inside lock box 105 insulated from the outside environment. Exemplary materials for construction of the lock box 105 may include but are not limited to one or more of wood, leather, metal that may include aluminum, iron or iron alloy such as steel (i.e., carbon steel, low alloy steel, and high allow steel), plastics (i.e., polyethylene terephthalate, high density polyethylene polyvinyl chloride, poly chloride, low density polyethylene, polypropylene, and or poly-para-phenylene terephthalamide), and other similar materials known in the art as well as concrete, gypsum, perlite, vermiculite, or diatomaceous earth, and other similar materials known to those of skill in the art for security, fire, water and heat insulative purposes.

Lock box 105 may include a bottom portion 115 and top portion 120. Bottom portion 115 may attach to top portion 120 in a variety of ways. For example, bottom portion 115 and top portion 120 may be attached together by hinges 130A and 130B at one end, and latches 135A and 135B at another end. As depicted, hinges 130A and 130B may be attached near connectors 110A and 110B. Alternatively, hinges 130A and 130B may be located on an opposite side of lock box 105 to that of connectors 110A and 110B. Hinges 130A and 130B may be located on a posterior end near connectors 110A and 110B. Alternatively, hinges 130A and 130B may be located on either the left, right or on the opposite side of connectors 110A and 110B. Hinges 130A and 130B may be one or more of the following: piano hinge, concealed hinge, spring loaded hinge, ball bearing hinge, strap hinge, butt hinge, barrel hinge or other types of hinges known to those of skill in the art. Lock box 105 may comprise a single hinge 130A or a plurality of hinges 130A, 130B. Further, lock box 105 may have one latch 135A or a plurality of latches 135A, 135B. Latches 135A and 135B may be, but not limited to, one or more of the following: cam latches, compression latches, slam latches, swell latches, toggle latches, and any other types of latches known to those of skill in the art. Latches 135A and 135B may incorporate a magnet on either bottom portion 115 and/or top portion 120. Alternatively, in another embodiment lock box 105 may have no latches 135A and 135B and may connect together using hinges 130A and 130B and lock 125.

Lock 125, in device 100 is depicted as an inset key lock. Alternatively, lock 125 may be a combination lock, biometric lock, a magnetic lock (including a key card lock), cam lock, rim lock, knife hinge lock, lever handle lock, glass door lock, and/or cable lock. Further lock 125 may be inset within lock box 105 or may be a pad lock locking top portion 120 to bottom portion 115. Handle 140 may also be attached to the outside of lock box 105 to facilitate carrying the lock box 105 to or from a vehicle. Handle 140, as depicted, may be located opposite hinges 130A and 130B. Alternatively, one or more handles 140 may be placed on any outside portion of lock box 105. Around handle 140 may be a recess such that when handle 104 is folded down it may rest flat against an outside edge of lock box 105. Handle 140 may be a wooden, plastic, metal, leather and may use natural or synthetic material. Further, handle 140 may be a rope, strap, knob, cup, ring etc. Indeed, a plurality of handles 140 may be located on a same or different side of lock box 105. In an alternative, embodiment handle 140 may be omitted from lock box 105. Lock box 105 may further include wheels and a telescoping handle 105 that may allow lock box 105 to function as luggage once unattached from the vehicle.

Connectors 110A and 110B may facilitate the attachment of lock box 105 to a vehicle. Connectors 110A and 110B may be located at the posterior portion of lock box 105. Connectors 110A and 110B may be positioned within lock box 105 that attach to lower anchors in a vehicle seat that are otherwise implemented as part of the LATCH or other systems to attach child car seats to the vehicle seat. Connectors 110A and 110B may be positioned within lock box 105 to attach to one or both lower anchors. Although it is to be noted that lockbox 105 or any similar device described herein may use non-consecutive anchors for connecting a lockbox, allowing the lockbox to be various sizes. For example, an anchor on the outside driver's side of the vehicle and an anchor on the outside of the passenger's side of the vehicle may be used as anchors for connecting to lock box 105. Since multiple anchors are provided in various vehicles, many different iterations and options exist for connecting lock box 105 to anchors in a vehicle. Alternatively, connectors 110A and 110B may be positioned at either the left, right, and or front side of lock box 105. Further, connectors 110A and 110B may be positioned on either the top portion 120 or the bottom portion 115 of lock box 105.

Connectors 110A and 110B may implement a rigid push connection and/or a flexible push connection. A connector with a rigid connection means one or more of connector 110A and 110B may be attached to a rigid frame be it plastic, metal, wood, or other rigid material known in the art. A connector with a flexible push connection means one or more 110A and 110B may be attached to a flexible strap belt, chain, cable, rope, webbing, or other flexible attachments known in the art. Further, connectors 110A and 110B may implement hook on rigid or flexible connections. Some other examples of connectors may comprise but are not limited to metal trigger clip, dog clip, swivel hook, flat metal hook, trigger clip, split ring hook, lobster claw, Japanese clip, egg hook, carabiner, or other types of hooks and clips known to those of ordinary skill in the art. A ratchet may be implemented with one or more of connectors 110A and/or 110B. The ratcheting portion of connectors 110A and 110B of may be located inside or outside of lock box 105. To that end, lock box 105 after being connected to one or more anchors may be tightened, lessening the distance between lock box 105 and the one or more anchors. In an alternative embodiment, connectors 110A and 110B may connect to a secure portion of the vehicle seat such as the frame and/or a seatbelt. Connectors 110A and 110B may further include a release mechanism 145 located inside lock box 105 to ensure that lock box 105 is opened by a key before lock box 105 is removable from a vehicle. Release mechanism 145 may be an individual button placed on each of connectors 110A and 110B or it may be a strap, a rod, and/or a bracket wherein both connectors 110A and 110B may be released by pulling on the strap. Release mechanism 145 may further have a handle to facilitate pulling the release. Additionally, connectors 110A and 110B may be connected to lock box 105 by release mechanism 145 that may be implemented as a bracket that additionally functions to secure the connection between box 105 and connectors 110A and 110B. Further, the bracket and release mechanism 145 may be separate and distinct portions of lock box 105. In an alternative embodiment the lock box 105 may include a drawer that can be opened without disconnecting anchors 110A an 110B.

Figure 2:
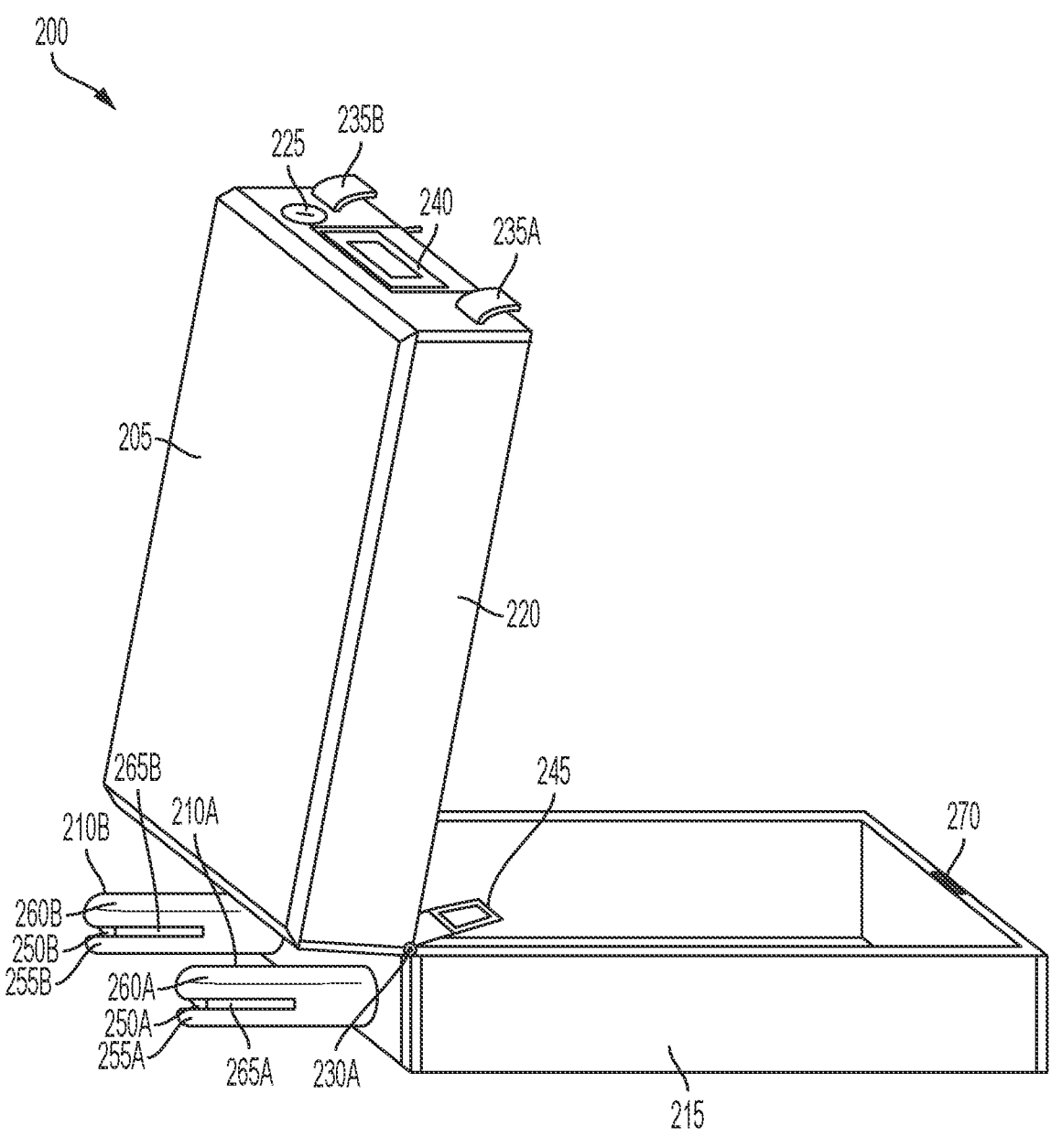
FIG. 2 illustrates a left-side perspective view of an unattached opened vehicular lock box.

FIG. 2 illustrates a left side perspective view of device 200 as an unattached opened vehicular lock box 205. Lock box 205 may be constructed of durable material that makes lock box 205 difficult to break or penetrate. Lock box 205 may include material that provides resistance to fires in that lock box 205 includes non-conductive insulation that keeps the contents inside lock box 205 insulated from the outside environment. Exemplary materials for construction of the lock box 205 may include but are not limited to one or more of wood, leather, metal that may include aluminum, iron or iron alloy such as steel (i.e., carbon steel, low alloy steel, and high allow steel), plastics (i.e., polyethylene terephthalate, high density polyethylene polyvinyl chloride, poly chloride, low density polyethylene, polypropylene, and or poly-para-phenylene terephthalamide), concrete, gypsum, perlite, vermiculite, or diatomaceous earth, and other similar materials known to those of ordinary skill in the art.

Lock box 205 may include a bottom portion 215 and top portion 220. Top portion 220 may include key lock 225, latches 235A and 235B and handle 240. In an alternative embodiment one or more of key lock 225, latches 235A and 235B, and handle 240 may be disposed in bottom portion 215. Bottom portion 215 may attach to top portion 220 in a variety of ways. For example, bottom portion 215 and top portion 220 may be attached together by hinges 230A and 130B (130B shown in FIG. 1 and not FIG. 2 due to perspective) at one end and latches 235A and 235B at another end. Hinges 230A and 130B may be attached on the same side as connectors 210A and 210B. Alternatively, hinges 230A and 130B may be located on an opposite side of lock box 205 to that of connectors 210A and 210B. Hinges 230A and 130B may be located, in an alternative embodiment, on either the left or the right-hand side. Hinges 230A and 130B may be, but are not limited to, one or more of the following: piano hinge, concealed hinge, spring loaded hinge, ball bearing hinge, strap hinge, butt hinge, dampening hinge, barrel hinge, or other types of hinges known to those of skill in the art. Lock box 205 may include a single hinge 230A or a plurality of hinges 230A and 130B. Further lock box 205 may have one latch 235A or a plurality of latches 235A, 235B. Latches 235A and 235B may be one or more of the following: draw latches, cam latches, compression latches, slam latches, swell latches, toggle latches, and any other types of latches known to those of skill in the art. Latches 235A and 235B may incorporate a magnet on either bottom portion 215 and/or top portion 220. Alternatively, in another embodiment lock box 205 may not include latches and may connect together using hinges 230A and 130B and lock 225. Lock 225 is depicted as an inset key lock 225. Lock 225 may be a combination lock, biometric lock, a magnetic lock, key card lock, cam lock, rim lock, knife hinge lock, lever handle lock, glass door lock, cable lock, or any other lock known to those of ordinary skill in the art suitable for the purposes herein. Further, lock 225 may be inset within lock box 205 or may include a pad lock locking top portion 220 to bottom portion 215. Lock 225, in device 200, is disposed in top portion 220 to secure top portion 220 to bottom portion 215 through striking plate 270. Striking plate 270 may include and opening where in a bar is disposed that mates with a hook found on lock 225. Alternatively, striking plate 270 may include whatever elements are suitable to secure bottom portion 215 to top portion 220 while using various types of locks known in the art.

Handle 240 may be attached to the outside of lock box 205 to facilitate carrying lock box 205. Handle 240, as depicted, may be located opposite hinge 230A. A recess may be positioned around handle 240 that allows handle 240 to rest flat against an outside edge of lock box 205 when folded. Handle 240 may be made using a wooden, plastic, metal, leather including natural and/or synthetic material. Further, handle 240 may be a rope, a strap, a knob, a cup, a ring etc. Indeed, a plurality of handles 240 may be located on a same or one or more different sides of lock box 205. In an alternative embodiment, handle 240 may be omitted from lock box 205. Lock box 205 may further include wheels and telescoping elements within handle 240 that may allow lock box 205 to function in a manner similar to that of standard luggage.

Connectors 210A and 210B may connect lock box 205 to a vehicle. Connectors 210A and 210B may be located at the posterior portion of lock box 205. Connector 210A may include upper fork 260A and lower fork 255A with gap 265A disposed between upper fork 260A and lower fork 255A. Bridging, or at least partially bridging gap 265A from upper fork 260A to lower fork 255A, is catch 250A. Catch 250A facilitates attachment of lock box 205 to a vehicle and may allow an anchor or ring to slide into gap 265A. Once an anchor or ring slides past catch 250A the anchor or ring is trapped and is released by release mechanism 245. Connectors 210A and 210B may be partially disposed within lock box 205 while being partly disposed on the outside of lock box 205. The outside portion of connectors 210A and 210B may attach to anchors or rings as described above. Connectors 210A and 210B may be retractable and stored within an inside portion of lock box 205. The anchors or rings to which connectors 210A and 210B may be attached, may be part of the LATCH or other anchor systems and provided in a vehicle. Alternatively, connectors 210A and 210B may be positioned at either the left, right, and or front side of lock box 205. Further, connectors 210A and 210B may be positioned on either the top portion 220 or the bottom portion 215 of lock box 205.

Connectors 210A and 210B may be positioned within lock box 205 to attach to one or more lower anchors. Connectors 210A and 210B may implement a rigid push connection and/or a flexible push connection. A connector with a rigid connection means one or more of connector 210A and 210B may be attached to a rigid frame be it plastic, metal, wood, or other rigid material known in the art. A connector with a flexible push connection means one or more 210A and 210B may be attached to a flexible strap belt, chain, cable, rope, webbing, or other flexible attachments known in the art. Further, connectors 210A and 210B may attach to a rigid or flexible connections on an end opposite catch 250A and 250B. Some other examples of connectors may comprise but are not limited to metal trigger clip, dog clip, swivel hook, flat metal hook, trigger clip, split ring hook, lobster claw, Japanese clip, egg hook, carabiner, or any other hook or clip known to those of skill in the art that would be suitable for the purposes described herein. A ratchet may be used with one or more of connectors 210A and 210B. The ratcheting portion of connectors 210A and 210B may be located inside or outside of lock box 205. In this manner, lock box 205 may be connected to one or more anchors and may then be tightened, lessening the distance between lock box 205 and the one or more anchors. In an alternative embodiment, connectors 210A and 210B may connect to a secure portion of the vehicle seat such as a frame and/or a seatbelt. Connectors 210A and 210B may further include a release mechanism 245 located inside lock box 205. Release mechanism 245 may be an individual button placed on each of connectors 210A and 210B or may be implemented by a strap, a rod, and/or a bracket wherein both connectors 210A and 210B may be released by pulling (or other motion) on the strap, rod, and/or bracket. Release mechanism 245 may further include a handle to facilitate articulating the release. Additionally, connectors 210A and 210B may be connected to lock box 205 by release mechanism 245 that may be a bracket that additionally functions to secure the connection between box 205 and connectors 210A and 210B. Further, the bracket and release mechanism 245 may be separate and distinct portions of lock box 205. Further, the bracket and release mechanism 245 may be separate and distinct portions of lock box 205. In an alternative embodiment the lock box 205 may include a drawer that can be opened without disconnecting anchors 210A an 210B.

Figure 3:
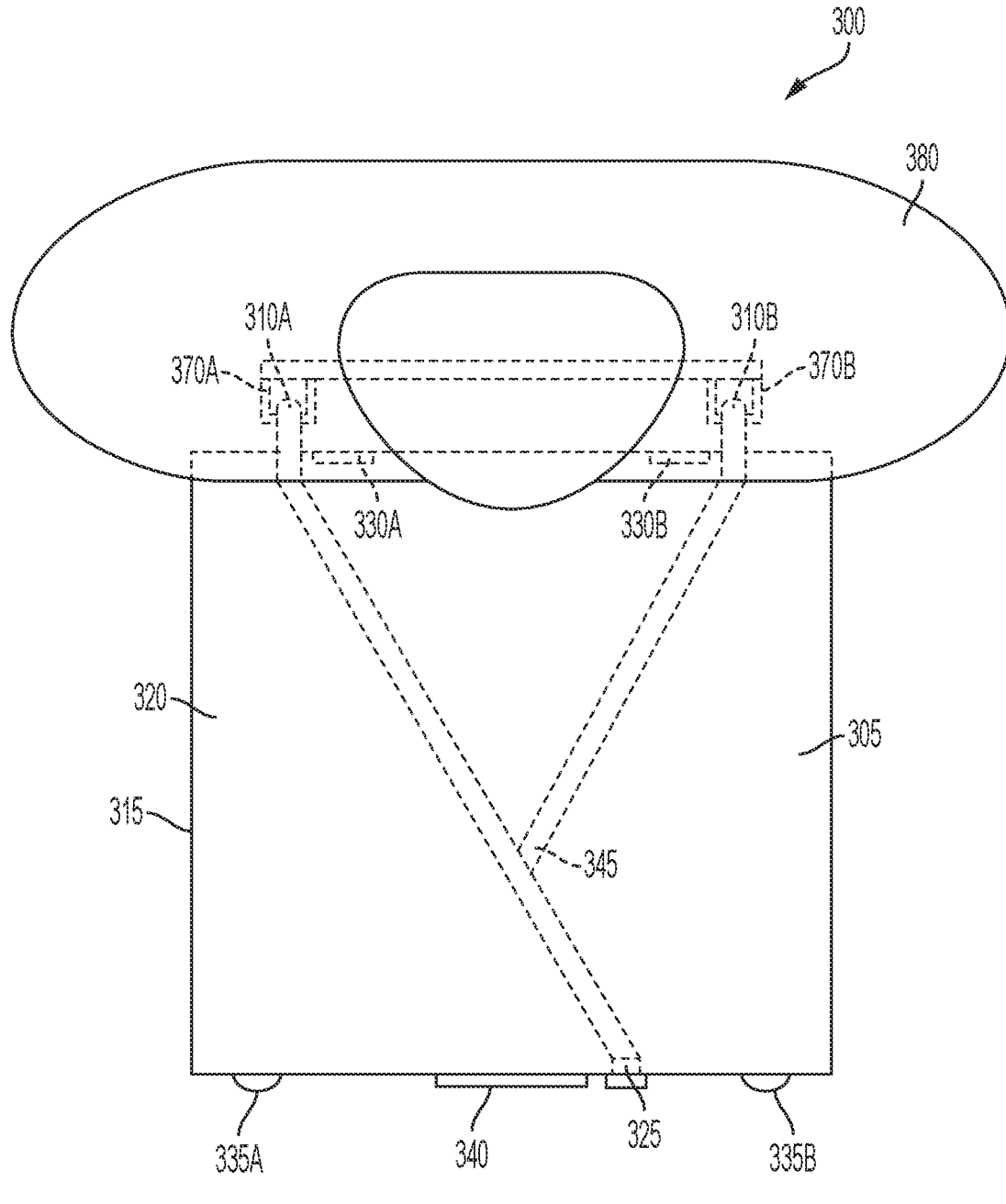
FIG. 3 illustrates a top view of an embodiment of an attached closed vehicular lock box.

FIG. 3 illustrates a top view of device 300 as an attached closed vehicular lock box 305. Lock box 305 may be constructed of durable material that makes lock box 305 difficult to break or penetrate. Lock box 305 may include material that provides resistance to fires in that lock box 305 include non-conductive insulation that keeps the contents of lock box 305 insulated from the outside environment. Exemplary materials for construction of the lock box 305 may include but are not limited to one or more of wood, leather, metal that may include aluminum, iron or iron alloy such as steel (i.e., carbon steel, low alloy steel, and high allow steel), plastics (i.e., polyethylene terephthalate, high density polyethylene polyvinyl chloride, poly chloride, low density polyethylene, polypropylene, and or poly-paraphenylene terephthalamide), concrete, gypsum, perlite, vermiculite, diatomaceous earth, and other similar materials known to those of skill in the art.

Lock box 305 may include a bottom portion 315 and top portion 320. Bottom portion 315 may attach to top portion 320 in a variety of ways. For example, bottom portion 315 and top portion 320 may be attached together by hinges 330A and 330B at one end and latches 335A and 335B at another end. As depicted, hinges 330A and 330B may be attached near connectors 310A and 310B. Alternatively, hinges 330A and 330B may be located on an opposite side of lock box 305 to that of connectors 310A and 310B. Hinges 330A and 330B may be located on a posterior end near connectors 310A and 310B or on either the left or the right-hand side or located on the opposite end of connectors 310A and 310B. Hinges 330A and 330B may comprise but are not limited to piano hinge, concealed hinge, spring loaded hinge, ball bearing hinge, strap hinge, butt hinge, barrel hinge, or other types of hinges known to those of skill in the art. Lock box 305 may include a single hinge 330A or a plurality of hinges 330A, 330B. Further, lock box 305 may have one latch 335A or a plurality of latches 335A, 335B.

Latches 335A and 335B may comprise but are not limited to draw latches, cam latches, compression latches, slam latches, swell latches, toggle latches and any other types of latches known to those of skill in the art. Latches 335A and 335B may incorporate a magnet on either bottom portion 315 and/or top portion 320. Alternatively, in one embodiment lock box 305 may have no latches and may connect together using hinges 330A and 330B and lock 325. Lock 325, in embodiment 300 is depicted as an inset key lock. Alternatively, lock 325 may be a combination lock, biometric lock, a magnetic lock (i.e., key card lock), cam lock, rim lock, knife hinge lock, lever handle lock, glass door lock, and/or cable lock, or any other lock known to those of skill in the art suitable for the purposes described herein. Further lock 325 may be inset within lock box 305 or may be a pad lock locking top portion 320 to bottom portion 315.

Handle 340 may also be attached to the outside of lock box 305 to facilitate carrying the lock box 305 from the vehicle. Handle 340, as depicted, may be located opposite hinges 330A and 330B. Alternatively, one or more handles 340 can be place on any outside portion of lock box 305. Around handle 340 may be a recess such that when handle 304 is folded down it may rest flat against an outside edge of lock box 305. Handle 340 may be a wooden, plastic, metal, leather and may use natural or synthetic material. Further, handle 340 may be a rope, strap, knob, cup, ring etc. Indeed, a plurality of handles 340 may be located on a same or different side of lock box 305. In an alternative, embodiment handle 340 may be omitted from lock box 305. Lock box 305 may further include wheels and a telescoping handle 305 that may allow lock box 305 to function as luggage once unattached from the vehicle.

Connectors 310A and 310B may connect lock box 305 to vehicle seat 380. Connectors 310A and 310B may be located at the posterior portion of lock box 305. Connectors 310A and 310B may be positioned within lock box 305 that attach to lower anchors in a vehicle seat that are otherwise implemented as part of the LATCH or other anchor systems to attach child car seats to the vehicle seat. Connectors 310A and 310B may be positioned within lock box 305 to attach to one or both lower anchors. Alternatively, connectors 310A and 310B may be positioned at either the left, right, and or front side of lock box 305. Further, connectors 310A and 310B may be positioned on either the top portion 320 or the bottom portion 315 of lock box 305. Connectors 310A and 310B may implement a rigid push connection as depicted but also may implement a flexible push connection. A connector with a rigid connection means one or more of connector 310A and 310B may be attached to a rigid frame be it plastic, metal, wood, or other rigid material known in the art. A connector with a flexible push connection means one or more 310A and 310B may be attached to a flexible strap belt, chain, cable, rope, webbing, or other flexible attachments known in the art. Further, connectors 310A and 310B may attach to a rigid or flexible connections on an end opposite catch 350A and 350B. Some other examples of connectors may comprise but are not limited to metal trigger clip, dog clip, swivel hook, flat metal hook, trigger clip, split ring hook, lobster claw, Japanese clip, egg hook, carabiner, or other types of hooks and clips known to those of ordinary skill in the art. A ratchet may be implemented with one or more of connectors 310A and 310B. The ratcheting portion of connectors 310A and 310B may be located inside or outside of lock box 305. In this manner, lock box 305 may connect to one or more anchors 370A and/or 370B and may then be tightened, lessening the distance between lock box 305 and the one or more anchors. In an alternative embodiment, connectors 310A and 310B may connect to a secure portion of the vehicle seat such as the frame and/or a seatbelt.

Connectors 310A and 310B may further include a release mechanism 345 located inside lock box 305 to ensure that lock box 305 is opened by a key before lock box 305 is removable from a vehicle. Release mechanism 345 may be an individual button place on each of connectors 310A and 310B or it may be a strap, a rod, and or a bracket wherein both connectors 310A and 310B may be released by pulling on the strap, rod and/or bracket. Furthermore, release mechanism may be attached to lock 325 such that when a key is inserted and turned a certain direction connectors 310A and 310B may be released from anchors 370A and 370B, respectively. For example, if an inserted key is turned to the left the lock box 305 may detach from anchors 370A and 370B. Moreover, if the key is turned to the right lock box may disconnect bottom portion 315 from top portion 320 allowing access to contents within lock box 305. This same process may occur using various locks such that one way of unlocking results in the releasing connector 310B from anchors 370A and 370B and another disconnects bottom portion 315 from upper portion 320 of lock box 305. For example, on a combination lock, one combination may disconnect bottom portion 315 from upper portion 320 of lock box 305 while another combination may release the lock box 305 from anchors 370A and 370B. Release mechanism 345 may further have a handle to facilitate pulling the release. Additionally, connectors 310A and 310B may be connected to lock box 305 by release mechanism 345 that may be a bracket that additionally functions to secure the connection between box 305 and connectors 310A and 310B. Further, the bracket and release mechanism 345 may be separate and distinct portions of lock box 305. In an alternative embodiment the lock box 305 may include a drawer that can be opened without disconnecting anchors 310A an 310B.

Figure 4:
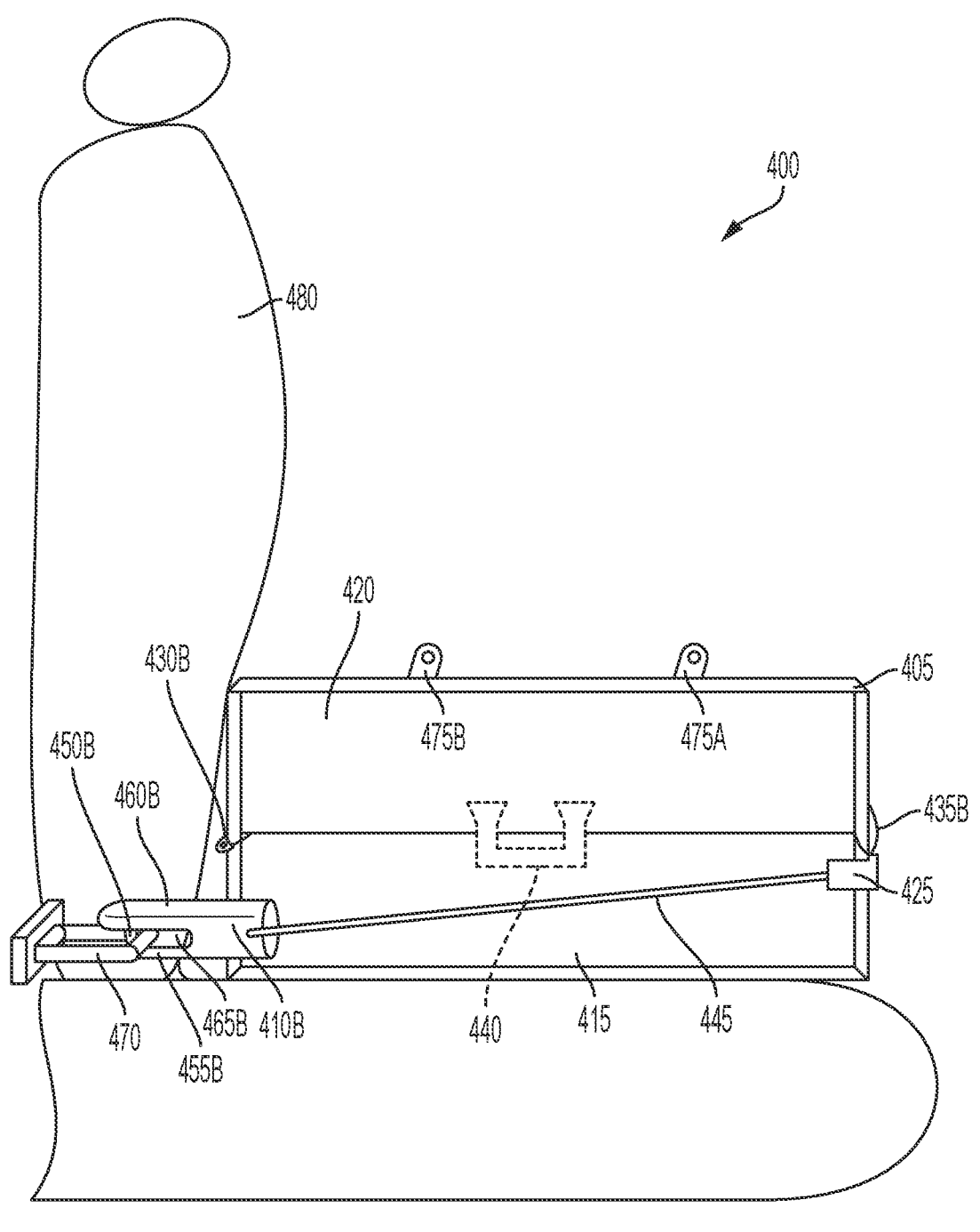
FIG. 4 illustrates a left-side cutout view of an embodiment of an attached closed vehicular lock box.

FIG. 4 illustrates a left-side cutout view of device 400 as an attached closed vehicular lock box 405. Since device 400 only includes a left side view it is intended that a right-side view may include one or more elements similar to those found in embodiment 400. Lock box 405 may be constructed of durable material that makes lock box 405 difficult to break or penetrate. Also, lock box 405 may include material that allows lock box 405 to function as a fire safe in that the composition includes non-conductive insulation that helps keep the contents of lock box 405 insulated from the outside environment. Exemplary materials for the construction of the lock box 405 may include but are not limited to one or more of wood, leather, metal that may include aluminum, iron or iron alloy such as steel (i.e., carbon steel, low alloy steel, and high allow steel), plastics (i.e., polyethylene terephthalate, high density polyethylene polyvinyl chloride, poly chloride, low density polyethylene, polypropylene, and or poly-paraphenylene terephthalamide), concrete, gypsum, perlite, vermiculite, or diatomaceous earth, and other similar materials known to those of skill in the art.

Bottom portion 415 may include lock 425, and latch 435B. While top portion may include handle 440 shown in embodiment 400 on the left outside of lock box 405. In an alternative embodiment, one or more of locks 425, latch 435B, and handles 440 may be disposed on either bottom portion 415 or top portion 420. Bottom portion 415 may attach to top portion 420 in a variety of ways. For example, bottom portion 415 and top portion 420 may be attached together by hinge 430B at one end and lock 425 at another end. As depicted hinge 430B may be attached near connector 410B. Alternatively, hinge 430B may be located on an opposite side of lock box 405 to that of connector 410B. Hinge 430B may be, but not limited to, one or more of the following: piano hinge, concealed hinge, spring loaded hinge, ball bearing hinge, strap hinge, butt hinge, dampening hinge, barrel hinge or any other types of hinges known to those of skill in the art. Lock box 405 may include a single hinge 430B or a plurality of hinges 430A, 430B. Further, lock box 405 may have one latch 435B or a plurality of latches 435A, 435B. Latch 435B may be but is not limited to a draw latch, cam latch, compression latch, slam latch, swell latch, toggle latch, and any other types of latches known to those of skill in the art. Latch 435B may incorporate a magnet on either bottom portion 415 and/or top portion 420. Alternatively, lock box 405 may have no latches and may connect together using hinge 430B and lock 425. Lock 425 is depicted as an inset key lock 425. Alternatively, lock 425 may be a combination lock, biometric lock, a magnetic lock, key card lock, cam lock, rim lock, knife hinge lock, lever handle lock, glass door lock, cable lock, and/or any other type of lock known to those of ordinary skill in the art. Additionally, lock 425 may be inset within lock box 405 or may be a pad lock locking top portion 420 to bottom portion 415.

Handle 440 may also be attached to an outside of lock box 405 to facilitate carrying the lock box 405 from the vehicle. Handle 440, as depicted, may be located on a left-side of lock box 405. Alternatively, one or more handles 440 may be placed on any outside portion of lock box 405. Around handle 440 may be a recess such that when handle 440 is folded down it may rest flat against an outside edge of lock box 405. Handle 440 may be a wooden, plastic, metal, leather and may use natural or synthetic material. Further, handle 440 may be a rope, strap, knob, cup, ring etc. Indeed, a plurality of handles 440 may be located on a same or different side of lock box 405. In an alternative, embodiment handle 440 may be omitted from lock box 405. Lock box 405 may further include wheels and a telescoping handle 405 that may allow lock box 405 to function as luggage once unattached from the vehicle.

Connector 410B may connect lock box 405 to the vehicle seat 480. Connector 410B may be located at the posterior portion of lock box 405. Connector 410B may include upper forks 460B and lower forks 455B with gap 465B between an upper fork 460B and a lower fork 455B. Bridging from upper fork 460B to lower fork 455B, within gap 465B, may be catch 450B. Catch 450B facilitates the attachment to a vehicle and may allow anchor 470 to slide into gap 465B. Once an anchor 470 slides past catch 450B the anchor or ring is trapped and is released by release mechanism 445. Connector 410B may be partially disposed within lock box 405 and partially disposed outside of lock box 405. The outside portion of connector 410B may attach to lower anchors that are used as part of the LATCH or other anchor systems to attach child car seats. The inside portion of connector 410B may include release mechanism 445. Connector 410B may be attached to lock box 405 to be able to attach to one or both lower anchors. Connector 410B may be implemented a rigid push connection but also may alternatively be implemented as a flexible push connection. Further, connector 410B may be hook-on rigid or flexible connections. Some other examples of connectors may be but are not limited to metal trigger clip, dog clip, swivel hook, flat metal hook, trigger clip, split ring hook, lobster claw, Japanese clip, egg hook, carabiner, and/or any other type of hook or clip known in the art. A ratchet may also be used in conjunction with connector 410B. The ratcheting portion of connector 410B may be located inside or outside of the lock box 405. In this manner, the lock box 405 may be connected to anchor 470 and then tightened, lessening a distance between lock box 405 and anchor 470. In an alternative embodiment, connector 410B may connect to a secure portion of the vehicle seat such as the frame and/or a seatbelt. Connector 410B may further have a release mechanism 445 located inside lock box 405. Release mechanism 445 may be an individual button disposed on connector 410B or release mechanism 445 may be a strap, a rod, or a bracket wherein connector 410B may be released by pulling on the strap, rod and/or bracket. Furthermore, release mechanism 445 may be attached to lock 425 such that when a key is inserted and turned a certain direction connector 410B may be released from anchor 470B. For example, if an inserted key is turned to the left the lock box 405 is detached from anchor 470B. Moreover, if the key is turned to the right, the lock releases or disconnects bottom portion 415 from upper portion 420 of lock box 405 lock box such that lockbox 405 opens. This same process may occur using various locks such that one way of unlocking results in the releasing connector 410B from anchor 470B and another way of unlocking disconnects bottom portion 415 from upper portion 420 of lock box 405. For example, on a combination lock one combination may disconnect bottom portion 415 from upper portion 420 of lock box 405 while another combination may release the lock box 405 from anchor 470B. In an alternative embodiment the lock box 405 may include a drawer that can be opened without disconnecting anchors 410A an 410B.

Lock box 405 may further include child seat attachments 475A and 475B attached to top portion 420. Attachments 475A and 475B may mate with corresponding attachments found on a correlating child car seat or booster seat. This may allow the child car seat or booster seat to take advantage of anchor 470 that attaches through connector 410B. In an alternative embodiment, other products or devices may be attachable to lock box 405 such as a cooler, a basket, luggage, backpack, purse, briefcase, grocery bags etc.

Figure 5:
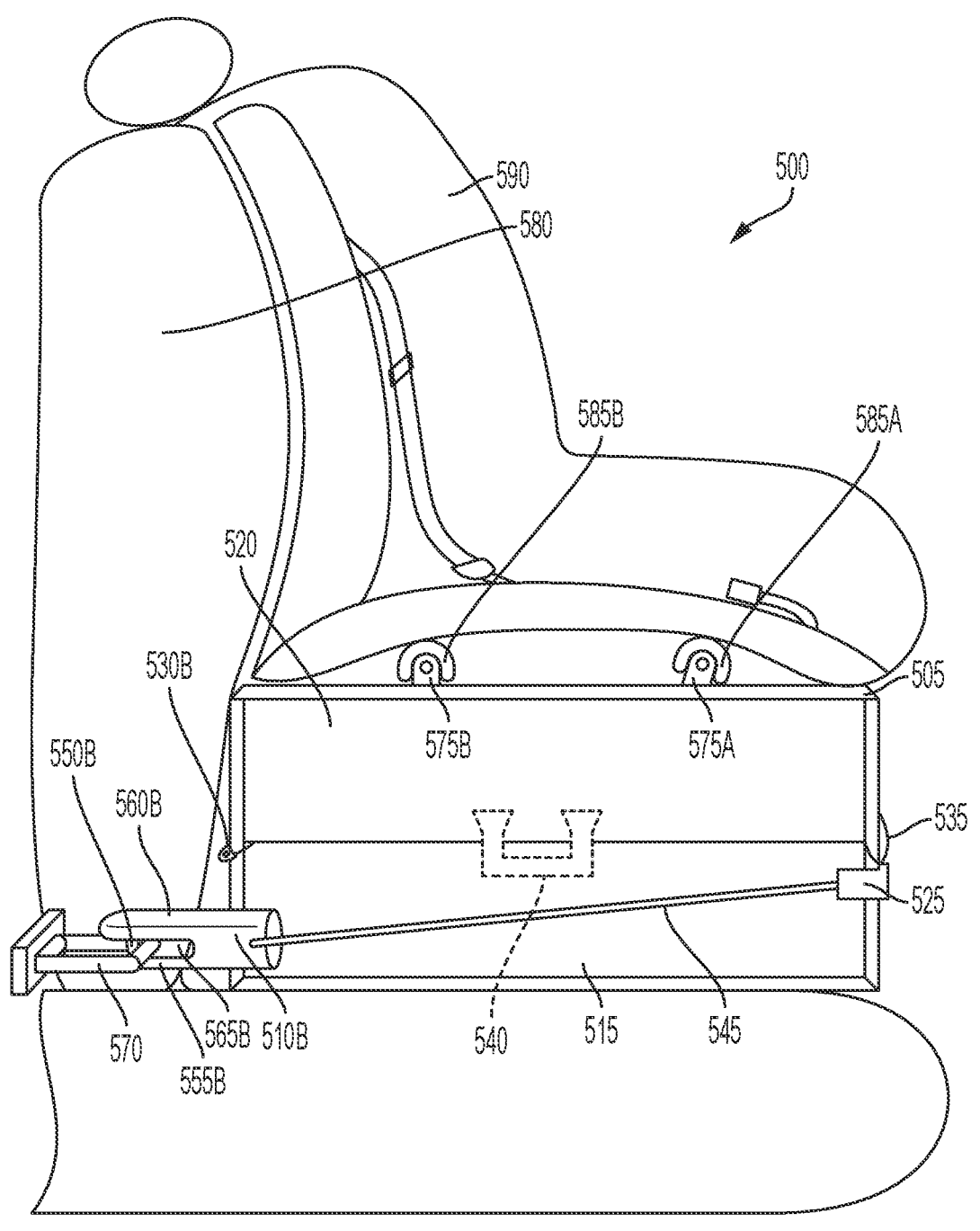
FIG. 5 illustrates a left-side cutout view of an embodiment of an attached closed vehicular lock box with a seat attachment.

FIG. 5 illustrates a left-side cutout view of device 500 as an attached closed vehicular lock box 505 with child seat or booster seat 590 attached. Since device 500 only includes a left side view it is intended a right-side view may include one or more elements similar to those discussed with respect to device 500. Lock box 505 may be constructed of durable material that makes lock box 105 difficult to break or penetrate. Lock box 505 may include material that provides resistance to fires in that lock box 105 may include non-conductive insulation that keeps the contents of lock box 505 insulated from the outside environment. Exemplary materials for construction of the lock box 505 may include but are not limited to one or more of wood, leather, metal that may include aluminum, iron or iron alloy such as steel (i.e., carbon steel, low alloy steel, and high allow steel), plastics (i.e., polyethylene terephthalate, high density polyethylene polyvinyl chloride, poly chloride, low density polyethylene, polypropylene, and or poly-paraphenylene terephthalamide), and other materials known to those of skill in the art as well as concrete, gypsum, perlite, vermiculite, or diatomaceous earth and other materials that are known to those of skill in the art for fire insulation purposes.

Bottom portion 515 may include lock 525, and latch 535B. While top portion 520 may include handle 540 shown in exemplary embodiment 500 on the left outside of lock box 505. In an alternative embodiment one or more of locks 525, latch 535B, and handles 540 may be disposed on either bottom portion 515 or top portion 520. Bottom portion 515 may attach to top portion 520 in a variety of ways. For example, bottom portion 515 and top portion 520 may be attached together by hinge 530B at one end and lock 525 at another end. As depicted, hinge 530B may be attached near connector 510B. Alternatively, hinges 530B may be located on an opposite side of lock box 505 to that of connector 510B. Hinge 530B may be but is not limited to piano hinge, concealed hinge, spring loaded hinge, ball bearing hinge, strap hinge, butt hinge, barrel hinge, and/or any other types of hinges known to those of skill in the art. Lock box 505 may include a single hinge 530B or a plurality of hinges 530A, 530B. Further, lock box 505 may have one latch 535B or a plurality of latches 535A, 535B. Latch 535B may comprise but is not limited to a draw latch, cam latch, compression latch, slam latch, swell latch, toggle latch, and any other types of latches known to those of skill in the art. Latch 535B may incorporate a magnet on either bottom portion 515 and/or top portion 520. Alternatively, in another embodiment lock box 505 may have no latches and may connect together using hinge 530B and lock 525. Lock 525 may be an inset key lock 525. Alternatively, lock 525 may be a combination lock, biometric lock, a magnetic lock, key card lock, cam lock, rim lock, knife hinge lock, lever handle lock, glass door lock, cable lock, or any other type of lock known to those of ordinary skill in the art. Additionally, lock 525 may be inset within lock box 505 or may be a pad lock locking top portion 520 to bottom portion 515.

Handle 540 may also be attached to the outside of lock box 505 to facilitate carrying the lock box 505 from the vehicle. Handle 540, as depicted, may be located on the left-side of lock box 505. Alternatively, one or more handles 540 may be placed on any outside portion of lock box 505. Around handle 540 may be a recess such that when handle 540 is folded down it may rest flat against an outside edge of lock box 505. Handle 540 may be a wooden, plastic, metal, leather and may use natural or synthetic material. Further, handle 540 may be a rope, strap, knob, cup, ring etc. Indeed, a plurality of handles 540 may be located on a same or different side of lock box 505. In an alternative embodiment, handle 540 may be omitted from lock box 505. Lock box 505 may further include wheels and a telescoping handle 540 that may allow lock box 505 to function as luggage once unattached from the vehicle.

Connector 510B may connect lock box 505 to the vehicle seat 580. Connector 510B may be located at a posterior portion of lock box 505. Connector 510B may include upper forks 560B and lower fork 555B with gap 565B between upper forks 560B and lower fork 555B. Bridging from upper fork 560B to lower fork 555B within gap 565B is catch 550B. Catch 550B may facilitate attachment to a vehicle and may allow lower anchor 570 to slide into gap 565B. Once an anchor 570 slides past catch 550B in gap 565B, the anchor or ring is trapped and is released by release mechanism 545. Connector 510B may be partially disposed within lock box 505 and partially disposed on an outside of lock box 505. The outside portion of connector 510B may attach to lower anchors that are used as part of the LATCH or other anchor systems to attach child car seats. The inside portion of connector 510B may include release mechanism 545. Connector 510B may be positioned within lock box 505 to be able to attach to one or both lower anchors. Connector 510B may be implemented a rigid push connection but also may be implemented as a flexible push connection. Further, connector 510B may implement hook-on rigid or flexible connections. Some other examples of connectors may comprise but are not limited to metal trigger clip, dog clip, swivel hook, flat metal hook, trigger clip, split ring hook, lobster claw, Japanese clip, egg hook, carabiner, and/or any other type of clip or hook known in the art. A ratchet may also be used with connector 510B. The ratcheting portion of connector 510B may be located inside or outside of the lock box 505. In this manner, the lock box 505 may be connected to anchor 570 and then may be tightened, lessening the distance between lock box 505 and anchor 570. In an alternative embodiment, connector 510B may connect to a secure portion of the vehicle seat such as the frame and/or a seatbelt. Connector 510B may further have a release mechanism 545 located inside lock box 505. Release mechanism 545 may be an individual button placed on connector 510B or release mechanism 545 may be a strap, a rod or a bracket wherein connector 510B may be released by pulling (or other unlocking motion) the strap, rod, or bracket. Furthermore, release mechanism may be attached to lock 525 such that when a key is inserted and turned a certain direction connector 510B may release from anchors 570. For example, if an inserted key is turned to the left the lock box 505 may detach from anchor 570. On the other hand, if the key is turned to the right lock box 505 may disconnect bottom portion 515 from top portion 520 allowing a user to access contents on the inside. This same process may occur using various locks such that one process of unlocking results in the releasing connector 510B from anchor 570 and another process disconnects bottom portion 515 from top portion 520. For example, on a combination lock one combination may disconnect bottom portion 515 from top portion 520 of lock box 505 while another combination may release the lock box 505 from anchor 570. In an alternative embodiment the lock box 505 may include a drawer that can be opened without disconnecting anchors 510A an 510B.

Lock box 505 may further include child seat attachments 575A and 575B attached to top portion 520. Attachments 575A and 575B may mate with corresponding attachments 585A and 585B found on a correlating child car seat or booster seat 590. This may allow the child car seat or booster seat 590 to take advantage of anchor 570 that attaches through connector 510B. As explained above, the right side of the cutout not in view may include one or more child seat attachments 575A and/or 575B. In an alternative embodiment, other things may be connectable to attachments 575A and 575B such as a cooler, food warmer, basket, luggage, backpack, purse, briefcase, grocery bags etc.

Figure 6:
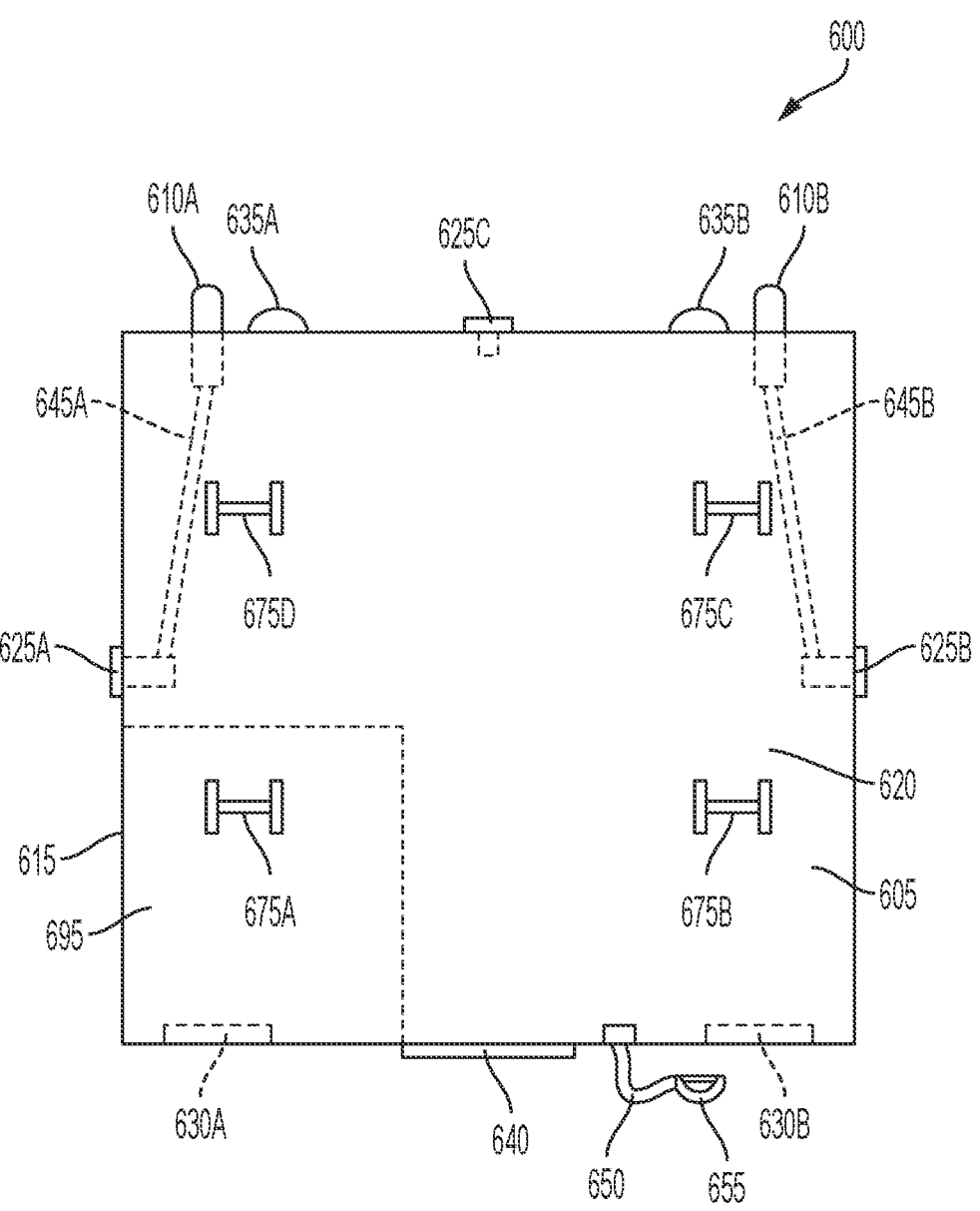
FIG. 6 illustrates a top view of an embodiment of an unattached closed vehicular lock box.

FIG. 6 illustrates a top view of a device 600 as an unattached closed vehicular lock box 605 unattached to a vehicle. Lock box 605 may be constructed of a durable material that makes lock box 105 difficult to break or penetrate. Lock box 605 may include material that provides resistance to fires in that lock box 105 may include non-conductive insulation that keeps the contents of lock box 605 insulated from the outside environment. Exemplary materials for construction of lock box 605 may include but are not limited to one or more of wood, leather, metal that may include aluminum, iron or iron alloy such as steel (i.e., carbon steel, low alloy steel, and high allow steel), plastics (i.e., polyethylene terephthalate, high density polyethylene polyvinyl chloride, poly chloride, low density polyethylene, polypropylene, poly-paraphenylene terephthalamide), and other materials known to those of ordinary skill in the art, as well as concrete, gypsum, perlite, vermiculite, diatomaceous earth and other materials known to those of ordinary skill in the art for fire insulation purposes.

Lock box 605 may include a bottom portion 615 and top portion 620. Bottom portion 615 may attach to top portion 620 in a variety of ways. For example, bottom portion 615 and top portion 620 may be attached together by hinges 630A and 630B at one end and latches 635A and 635B at another end. As depicted hinges 630A and 630B may be attached opposite to connectors 610A and 610B. Alternatively, hinges 630A and 630B may be located on the same side of lock box 605 as connectors 610A and 610B. Hinges 630A and 630B may be located on either the left or the right-hand side or located on the opposite end of connectors 610A and 610B. Hinges 630A and 630B may comprise but are not limited to piano hinge, concealed hinge, spring loaded hinge, ball bearing hinge, strap hinge, butt hinge, barrel hinge or other types of hinges known to those of skill in the art. Lock box 605 may comprise a single hinge 630A or a plurality of hinges 630A, 630B. Further lock box 605 may have one latch 635A or a plurality of latches 635A, 635B. Latches 635A and 635B may comprise but are not limited to draw latches, cam latches, compression latches, slam latches, swell latches, toggle latches, and any other types of latches known to those of skill in the art. Latches 635A and 635B may incorporate a magnet on either bottom portion 615 and/or top portion 620. Alternatively, in one embodiment lock box 605 may have no latches and may connect together using hinges 630A and 630B and lock 625A, 625B, and/or 625C.

Locks 625A, 625B, and 625C, in embodiment 600 are depicted as an inset key lock. Alternatively, locks 625A, 625B, and 625C may be a combination lock, biometric lock, a magnetic lock (including a key card lock), cam lock, rim lock, knife hinge lock, lever handle lock, glass door lock, cable lock, or any other type of lock known to those of skill in the art. Further locks 625A, 625B, and 625C may be inset within lock box 605 or may be a pad lock locking top portion 620 to bottom portion 615.

Handle 640 may also be attached to the outside of lock box 605 to facilitate carrying the lock box 605 from the vehicle. Handle 640, as depicted, may be located opposite hinges 630A and 630B. Alternatively, one or more handles 640 can be place on any outside portion of lock box 605. Around handle 640 may be a recess such that when handle 604 is folded down it may rest flat against an outside edge of lock box 605. Handle 640 may be a wooden, plastic, metal, leather and may use natural or synthetic material. Further, handle 640 may be a rope, strap, knob, cup, ring etc. In fact, there may be a plurality of handles 640 located on a same or different side of lock box 605. In an alternative, embodiment handle 640 may be omitted from lock box 605. Lock box 605 may further include wheels and a telescoping handle 640 that may allow lock box 605 to function as luggage once unattached from the vehicle.

Connectors 610A and 610B connect lock box 605 to the vehicle. Connectors 610A and 610B may be located at the posterior portion of lock box 605. Connector 610A and 610B may be positioned within lock box 605 to be attach to lower anchors that are used as part of the LATCH or other anchor systems to attach child car seats. Connectors 610A and 610B may be positioned within lock box 605 to be able to attach to one or both lower anchors. Connectors 610A and 610B may be a rigid push connection but also may be a flexible push connection. A connector with a rigid connection means one or more of connector 610A and 610B may be attached to a rigid frame be it plastic, metal, wood, or other rigid material known in the art. A connector with a flexible push connection means one or more 610A and 610B may be attached to a flexible strap belt, chain, cable, rope, webbing, or other flexible attachments known in the art. Further, connectors 610A and 610B may attach to a rigid or flexible connections on an end opposite catch 650A and 650B.

Further, connectors 610A and 610B may be hooked on rigid or flexible connections. Some other examples of connectors may comprise but are not limited to metal trigger clip, dog clip, swivel hook, flat metal hook, trigger clip, split ring hook, lobster claw, Japanese clip, egg hook, carabiner. A ratchet may be used with one or more of connectors 610A and 610B. The ratcheting portion of connectors 610A and 610B may be located inside or outside of the lock box 605. In this manner, the lock box 605 may be connected to one or more anchors and then may be tightened, lessening the distance between lock box 605 and the one or more anchors. In an alternative embodiment, connectors 610A and 610B may connect to a secure portion of the vehicle seat such as the frame and/or a seatbelt. Connectors 610A and 610B may further have release mechanisms 645A and 645B, respectively, located inside lock box 605. Release mechanisms 645A and 645B may be an individual button placed on each of connectors 610A and 610B or it may be a strap, rod, or bracket wherein both connectors 610A and 610B may be released by pulling (or other motion) on the strap, rod, or bracket. Release mechanisms 645A and 645B may individually connect to locks 625A and 625B respectively. This may actuate release mechanisms 645A and 645B as locks 625A and 625B are unlocked. A separate lock, lock 625C may be used primarily to disconnect bottom portion 615 from bottom portion 620 of lock box 605 while locks 625A and 625B are used to actuate the release mechanisms 645A and 645B respectively. Alternatively, release mechanisms 645A and 645B may be linked together by a single lock 625A, 625B, or 625C. To further secure lock box 605 to a vehicle seat strap 650 may be attached to the front half of lock box 605. Strap 650 may include fastener 655 which may be dispose on an end of the strap 650 that allows the strap 650 to attach to an inside portion of the vehicle such as a rear anchor.

In addition, lock box 605 may include pocket 695 located on the inside or the outside of lock box 605 to retain objects in one area of lock box 605. Further, lock box 605 may further include a plurality of pockets 695 where one or more of the plurality of pockets 695 may be made of netting. Additionally, pockets 695 may be closeable using a button, a zipper, a tie, hook and loop, a snap etc. Pockets 695 may also be lockable adding to the security of the contents within pocket 695.

Lock box 605 may further include child seat attachments 675A, 675B, 675C, and/or 675D disposed on lock box 605. Seat attachments 675A, 675B, 675C, and 675D may be disposed on any outside portion of lock box 605. One or more of attachments 675A, 675B, 675C, and/or 675D may mate with corresponding attachments found on a correlating child car seat or booster seat. This may allow the child car seat or booster seat to take advantage of anchors that attaches through connector 610A and or 610B. In an alternative embodiment, other products may be attachable to seat attachments 675A, 675B, 675C, and/or 675D such as a cooler, food warmer, basket, luggage, backpack, purse, briefcase, grocery bags. In an alternative embodiment the lock box 605 may include a drawer that can be opened without disconnecting anchors 610A an 610B.

Figure 7:
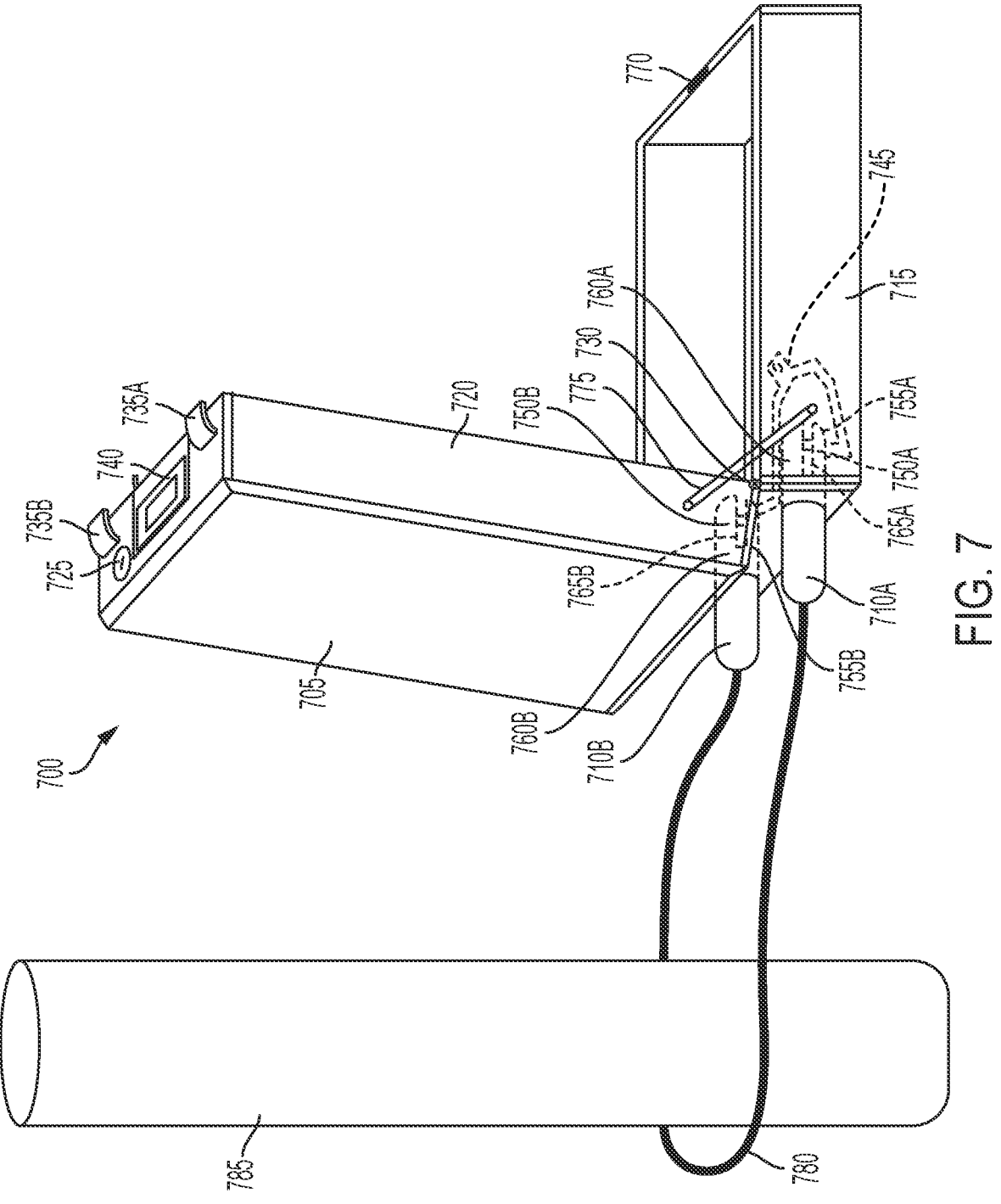
FIG. 7 illustrates a left side perspective view of a device as unattached opened vehicular lock bock with internal connecting connectors.

FIG. 7 illustrates a left side perspective view of device 700 as an unattached opened vehicular lock box 705 with internally connecting connectors 710A and 710B. Lock box 705 may be constructed of durable material that makes lock box 705 difficult to break or penetrate. Lock box 705 may include material that provides resistance to fires in that lock box 705 includes non-conductive insulation that keeps the contents inside lock box 705 insulated from the outside environment. Exemplary materials for construction of the lock box 705 may include but are not limited to one or more of wood, leather, metal that may include aluminum, iron or iron alloy such as steel (i.e., carbon steel, low alloy steel, and high allow steel), plastics (i.e., polyethylene terephthalate, high density polyethylene polyvinyl chloride, poly chloride, low density polyethylene, polypropylene, and or poly-paraphenylene terephthalamide), concrete, gypsum, perlite, vermiculite, or diatomaceous earth, and other similar materials known to those of ordinary skill in the art.

Lock box 705 may include a bottom portion 715 and top portion 720. Top portion 720 may include key lock 725, latches 735A and 735B and handle 740. In an alternative embodiment one or more of key lock 725, latches 735A and 735B, and handle 740 may be disposed in bottom portion 715. Bottom portion 715 may attach to top portion 720 in a variety of ways. For example, bottom portion 715 and top portion 720 may be attached together by hinges 730A and 130B (130B shown in FIG. 1 and not FIG. 7 due to perspective) at one end and latches 735A and 735B at another end. Hinges 730A and 130B may be attached on the same side as connectors 710A and 710B. Alternatively, hinges 730A and 130B may be located on an opposite side of lock box 705 to that of connectors 710A and 710B. Hinges 730A and 130B may be located, in an alternative embodiment, on either the left or the right-hand side. Hinges 730A and 730B may be, but are not limited to, one or more of the following: piano hinge, concealed hinge, spring loaded hinge, ball bearing hinge, strap hinge, butt hinge, dampening hinge, barrel hinge, or other types of hinges known to those of skill in the art. Lock box 705 may include a single hinge 730A or a plurality of hinges 730A and 730B. Further lock box 705 may have one latch 735A or a plurality of latches 735A, 735B. Latches 735A and 735B may be one or more of the following: draw latches, cam latches, compression latches, slam latches, swell latches, toggle latches, and any other types of latches known to those of skill in the art. Latches 735A and 735B may incorporate a magnet on either bottom portion 715 and/or top portion 720. Alternatively, in another embodiment lock box 705 may not include latches and may connect together using hinges 730A and 130B and lock 725. Lock 725 is depicted as an inset key lock 725. Lock 725 may be a combination lock, biometric lock, a magnetic lock, key card lock, cam lock, rim lock, knife hinge lock, lever handle lock, glass door lock, cable lock, or any other lock known to those of ordinary skill in the art suitable for the purposes herein. Further, lock 725 may be inset within lock box 705 or may include a pad or another lock locking top portion 720 to bottom portion 715. Lock 725, in device 700, is disposed in top portion 720 to secure top portion 720 to bottom portion 715 through striking plate 770. Striking plate 770 may include and opening where in a bar is disposed that mates with a hook found on lock 725. Alternatively, striking plate 770 may include whatever elements are suitable to secure bottom portion 715 to top portion 720 while using various types of locks known in the art.

Handle 740 may be attached to the outside of lock box 705 to facilitate carrying lock box 705. Handle 740, as depicted, may be located opposite hinge 730A. A recess may be positioned around handle 740 that allows handle 740 to rest flat against an outside edge of lock box 705 when folded. Handle 740 may be a wooden, plastic, metal, leather including natural and/or synthetic material. Further, handle 740 may be a rope, a strap, a knob, a cup, a ring etc. Indeed, a plurality of handles 740 may be located on a same or one or more different sides of lock box 705. In an alternative embodiment, handle 740 may be omitted from lock box 705.

Lock box 705 may further include wheels and telescoping elements within handle 740 that may allow lock box 705 to function in a manner similar to that of standard luggage.

Connectors 710A and 710B may connect lock box 705 to a vehicle, a desk, or another stationary or mobile anchoring point such as external anchor 780. One or both of connectors 710A and 710B may connect to internal anchor 775. Further connectors 710A and 710B may also attach to a cable 780 that may loop around or through external anchor 780 securing lockbox 705 in place with the connectors connecting internally to internal anchor 775. Connector 710A may include upper fork 760A and lower fork 755A with gap 765A disposed between upper fork 760A and lower fork 755A. Bridging, or at least partially bridging gap 765A from upper fork 760A to lower fork 755A, is catch 750A. Catch 750A facilitates attachment of lock box 705 to external anchor 780 and may allow internal anchor 775 to slide into gap 765A. Similarly to connector 710A, 710B may include upper fork 760B and lower fork 755B with gap 765B disposed between upper fork 760B and lower fork 755B. Bridging, or at least partially bridging gap 765B from upper fork 760B to lower fork 755B, is catch 750B. Catch 750B facilitates attachment of lock box 705 to external anchor 780 and may allow internal anchor 775 to slide into gap 765B. Once internal anchor 775 slides past catch one or both of 750A and 750B internal anchor 775 is trapped and may be released by release mechanism 745. Connectors 710A and 710B may be partially disposed within lock box 705 while being partly disposed on the outside of lock box 705. The outside portion of connectors 710A and 710B may attach to anchors or rings as described above. Connectors 710A and 710B may be retractable and stored within an inside portion of lock box 705.

Connectors 710A and 710B may implement a rigid push connection but also may implement a flexible push connection. A connector with a rigid connection means one or more of connector 710A and 710B may be attached to a rigid frame be it plastic, metal, wood, or other rigid material known in the art. A connector with a flexible push connection means one or more 710A and 710B may be attached to a flexible strap belt, chain, cable, rope, webbing, or other flexible attachments known in the art. Further, connectors 710A and 710B may attach to a rigid or flexible connections on an end opposite catch 750A and 750B. Some other examples of connectors may comprise but are not limited to metal trigger clip, dog clip, swivel hook, flat metal hook, trigger clip, split ring hook, lobster claw, Japanese clip, egg hook, carabiner, or any other hook or clip known to those of skill in the art that would be suitable for the purposes described herein.

A ratchet may be used with one or more of connectors 710A and 710B. The ratcheting portion of connectors 710A and 710B may be located inside or outside of lock box 705. In this manner, lock box 705 may be connected to one or more anchors and may then be tightened, lessening the distance between lock box 705 and the one or more anchors. In an alternative embodiment, connectors 710A and 710B may connect to a secure portion of the vehicle seat such as a frame and/or a seatbelt. Connectors 710A and 710B may further include a release mechanism 745 located inside lock box 705. Release mechanism 745 may be an individual button placed on each of connectors 710A and 710B or may be implemented by a strap, a rod, and/or a bracket wherein both connectors 710A and 710B may be released by pulling (or other motion) on the strap, rod, and/or bracket. Release mechanism 725 may further include a handle to facilitate articulating the release. Additionally, connectors 710A and 710B may be connected to lock box 705 by release mechanism 745 that may be a bracket that additionally functions to secure the connection between box 705 and connectors 710A and 710B. Further, the bracket and release mechanism 745 may be separate and distinct portions of lock box 705. In an alternative embodiment the lock box 605 may include a drawer that can be opened without disconnecting anchors 610A an 610B.

Figure 8:
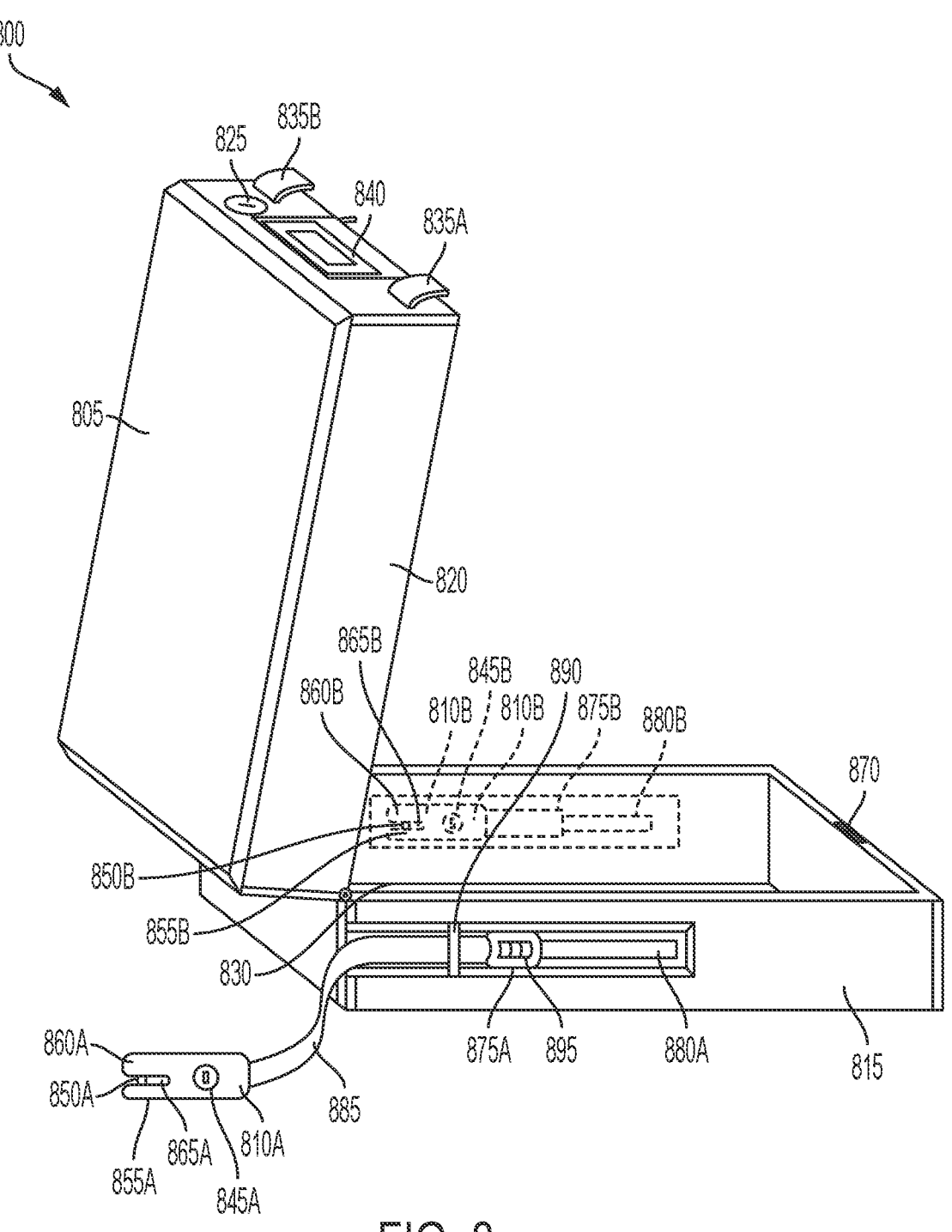
FIG. 8 illustrates an embodiment of a left-side perspective view of an unattached opened vehicular lock box.

FIG. 8 illustrates an embodiment of a left-side perspective view 800 of an unattached opened vehicular lock box 805. Lock box 805 may be constructed of durable material that makes lock box 805 difficult to break or penetrate. Lock box 805 may include material that provides resistance to fires in that lock box 805 includes non-conductive insulation that keeps the contents inside lock box 805 insulated from the outside environment. Exemplary materials for construction of the lock box 805 may include but are not limited to one or more of wood, leather, metal that may include aluminum, iron or iron alloy such as steel (i.e., carbon steel, low alloy steel, and high allow steel), plastics (i.e., polyethylene terephthalate, high density polyethylene polyvinyl chloride, poly chloride, low density polyethylene, polypropylene, and or poly-paraphenylene terephthalamide), concrete, gypsum, perlite, vermiculite, or diatomaceous earth, and other similar materials known to those of ordinary skill in the art.

Lock box 805 may include a bottom portion 815 and top portion 820. Top portion 820 may include key lock 825, latches 835A and 835B and handle 840. In an alternative embodiment one or more of key lock 825, latches 835A and 835B, and handle 840 may be disposed in bottom portion 815. Bottom portion 815 may attach to top portion 820 in a variety of ways. For example, bottom portion 815 and top portion 820 may be attached together by hinges 830A and 130B (130B shown in FIG. 1 and not FIG. 8 due to perspective) at one end and latches 835A and 835B at another end. Hinges 830A and 130B may be attached on the same side as connectors 810A and 810B. Alternatively, hinges 830A and 130B may be located on an opposite side of lock box 805 to that of connectors 810A and 810B. Hinges 830A and 130B may be located, in an alternative embodiment, on either the left or the right-hand side. Hinges 830A and 130B may be, but are not limited to, one or more of the following: piano hinge, concealed hinge, spring loaded hinge, ball bearing hinge, strap hinge, butt hinge, dampening hinge, barrel hinge, or other types of hinges known to those of skill in the art. Lock box 805 may include a single hinge 830A or a plurality of hinges 830A and 130B. Further lock box 805 may have one latch 835A or a plurality of latches 835A, 835B. Alternatively, lock box 805 may be found without either latch 835A or 835B. Latches 835A and 835B may be one or more of the following: draw latches, cam latches, compression latches, slam latches, swell latches, toggle latches, and any other types of latches known to those of skill in the art. Latches 835A and 835B may incorporate a magnet on either bottom portion 815 and/or top portion 820. Alternatively, in another embodiment lock box 805 may not include latches and may connect together using hinges 830A and 130B and lock 825. Lock 825 is depicted as an inset key lock 825. Lock 825 may be a combination lock, biometric lock, a magnetic lock, key card lock, cam lock, rim lock, knife hinge lock, lever handle lock, glass door lock, cable lock, or any other lock known to those of ordinary skill in the art suitable for the purposes herein. Further, lock 825 may be inset within lock box 805 or may include a pad lock locking top portion 820 to bottom portion 815. Lock 825, in device 800, is disposed in top portion 820 to secure top portion 820 to bottom portion 815 through striking plate 870. Striking plate 870 may include and opening where in a bar is disposed that mates with a hook found on lock 825. Alternatively, striking plate 870 may include whatever elements are suitable to secure bottom portion 815 to top portion 820 while using various types of locks known in the art.

Handle 840 may be attached to the outside of lock box 805 to facilitate carrying lock box 805. Handle 840, as depicted, may be located opposite hinge 830A. A recess may be positioned around handle 840 that allows handle 840 to rest flat against an outside edge of lock box 805 when folded. Handle 840 may be a wooden, plastic, metal, leather including natural and/or synthetic material. Further, handle 840 may be a rope, a strap, a knob, a cup, a ring etc. Indeed, a plurality of handles 840 may be located on a same or one or more different sides of lock box 805. In an alternative embodiment, handle 840 may be omitted from lock box 805. Lock box 805 may further include wheels and telescoping elements within handle 840 that may allow lock box 805 to function in a manner similar to that of standard luggage.

Connectors 810A and 810B may connect lock box 805 to a vehicle. Connectors 810A and 810B which may be located on one or both sides of lock box 805. So that connectors 810A and 810B may slide back and forth on a rail 880A and 880B respectively. Rail 880A and 880B may be positioned inside a recessed portion of lock box 805. Connectors 810A and 810B may attach to slides 875A and 875B and slides 875A and 875B may attach to rails 880A and 880B. Alternatively, connectors 810A and 810B may attach directly to rails 880A-B. Further, connectors 810A and 810B may include a swivel to point to an anchor or other attachment point. Moreover, connector 810A may attach to slider 875A with belt 885. To help guide belt 885 keeper 890 may be included. Keeper 890 may be positioned between the slider 875A and the posterior end of the lock box 805 as to allow connector 810A be positioned as to not extend beyond the posterior end of box 805. The posterior end of box 805 in this embodiment is the end containing hinge 830. In other words, the posterior end that is intended to be positioned nearest the anchors. Slider 875A, in addition to or in place of lock 845A, may include lock 895. Lock 895 be a combination lock, biometric lock, a magnetic lock (including a key card lock), cam lock, rim lock, knife hinge lock, lever handle lock, glass door lock, and/or cable lock. Sliders 875A and 857B may function as a ratchet as slider slides towards the front of lock box 805. The front end of lock box in this circumstance is the opposite end of hinge 830. In other words, the front end is intended to be positioned opposite the anchors. Alternatively, connector 810B may be attached directly to slider 875B absent flexible belt 885. Slider 875B may be long enough to extend connector 810B to reach an anchor. Connectors 810A 810B may include lock 845A and 845B respectively. Locks 845A and 845B may be a combination lock, biometric lock, a magnetic lock (including a key card lock), cam lock, rim lock, knife hinge lock, lever handle lock, glass door lock, and/or cable lock. Locks 845A and 845B may be used to lock connectors 810 in place either in a stowed position (slide to the side of lock box 805) or an active position (connected to one or more anchors as depicted in FIGS. 3-5). Connectors 810A and 810B may include upper fork 860A and lower fork 855A with gap 865A disposed between upper fork 860A and lower fork 855A. Bridging, or at least partially bridging gap 865A from upper fork 860A to lower fork 855A, is catch 850A. Catch 850A facilitates attachment of lock box 805 to a vehicle and may allow an anchor or ring to slide into gap 865A. Once an anchor or ring slides past catch 850A the anchor or ring is trapped and is released by release mechanism 845. Connectors 810A and 810B may be partially disposed within lock box 805 while being partly disposed on the outside of lock box 805. The outside portion of connectors 810A and 810B may attach to anchors or rings as described above. Connectors 810A and 810B may be retractable and stored within an inside portion of lock box 805. The anchors or rings to which connectors 810A and 810B may be attached, may be part of the LATCH or other anchor system and provided in a vehicle.

Connectors 810A and 810B may be positioned within lock box 805 to attach to one or more lower anchors. Connectors 810A and 810B may implement a rigid push connection but also may implement a flexible push connection. A connector with a rigid connection means one or more of connector 810A and 810B may be attached to a rigid frame be it plastic, metal, wood, or other rigid material known in the art. A connector with a flexible push connection means one or more 810A and 810B may be attached to a flexible strap belt, chain, cable, rope, webbing, or other flexible attachments known in the art. Further, connectors 810A and 810B may attach to a rigid or flexible connections on an end opposite catch 850A and 850B. Some other examples of connectors may comprise but are not limited to metal trigger clip, dog clip, swivel hook, flat metal hook, trigger clip, split ring hook, lobster claw, Japanese clip, egg hook, carabiner, or any other hook or clip known to those of skill in the art that would be suitable for the purposes described herein. A ratchet may be used with one or more of connectors 810A and 810B. The ratcheting portion of connectors 810A and 810B may be located inside or outside of lock box 805. In this manner, lock box 805 may be connected to one or more anchors and may then be tightened, lessening the distance between lock box 805 and the one or more anchors. In an alternative embodiment, connectors 810A and 810B may connect to a secure portion of the vehicle seat such as a frame and/or a seatbelt. Connectors 810A and 810B may further include a release mechanism 845 located inside lock box 805. Release mechanism 845 may be an individual button placed on each of connectors 810A and 810B or may be implemented by a strap, a rod, and/or a bracket wherein both connectors 810A and 810B may be released by pulling (or other motion) on the strap, rod, and/or bracket. Release mechanism 845 may further include a handle to facilitate articulating the release. Additionally, connectors 810A and 810B may be connected to lock box 805 by release mechanism 845 that may be a bracket that additionally functions to secure the connection between box 805 and connectors 810A and 810B. Further, the bracket and release mechanism 845 may be separate and distinct portions of lock box 805.

Additionally, lock box 805 may be equipped with an alarm system that activates if someone tries to open the box without a key or tries to release the connectors from the anchors without a key. Also, an alternative embodiment the lock box 805 may include a drawer that can be opened without disconnecting anchors 810A an 810B.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A lock box comprising:

an upper portion;

a lower portion connected to upper portion, the lower portion comprising:

a first connector and a second connector both extending away from the lower portion and detachably connectable to respective anchors, the first connector and the second connector connecting to the respective anchors via a first catch in the first connector and a second catch in the second connector, wherein the first catch is disposed in a portion of the first connector that extends away from the lower portion of the lock box and the second catch is disposed in a portion of the second connector that extends away from the lower portion of the lock box, wherein the first connector and the second connector each include a release mechanism that is wholly disposed inside the lock box and accessible only from inside the lock box;

a lock detachably connecting the upper portion and the lower portion together at a first end; and a hinge connecting the upper portion and the lower portion together at a second end.

2. The lock box of claim 1, wherein the lock locks the first connector to a first anchor and a second connector to a second anchor.

3. The lock box of claim 1, wherein the first connector and the second connector are attached to the posterior portion of the lower portion of the lock box.

4. The lock box of claim 1, wherein the first connector and the second connector are connectable to anchors in a vehicle installed in a child seat securing system configuration.

5. The lock box of claim 1, the lock box further comprising:

a handle.

6. The lock box of claim 1, the upper portion further comprising one or more child seat attachments.

7. The lock box of claim 6, wherein the one or more child seat attachments are attachable to a child seat.

8. The lock box of claim 7, the lock box further comprising:

a seat strap.

9. The lock box of claim 1, wherein the first connector and the second connector are attached to a flexible connection.

10. The lock box of claim 9, wherein the first connector and the second connector are attached to a rigid connection.

11. The lock box of claim 1, wherein the first connector and the second connector are attached to a side portion of the bottom portion of the lock box.

12. The lock box of claim 1, wherein the first connector and the second connector are attached to a belt.

13. The lock box of claim 1, wherein unlocking the lock detaches a connection between the top portion and the bottom portion of the lockbox and the first connector and the second connector at the same time.

14. The lock box of claim 1, wherein the lock disconnects the first connector and the second connector from their respective anchors without detaching the connection between the top portions and the bottom portions of the lock box.

15. The lock box of claim 1, wherein the first connector and the second connector each further comprising:

a lock.

16. The lock box of claim 1, the lock box further comprising:

a rail.

17. The lock box of claim 16, the lock box further comprising:

a slide connected to the rail.

18. The lock box of claim 17, where the slide further comprising:

a lock.

* * * * *